H. T. PREBLE.
TRACTOR.
APPLICATION FILED OCT. 16, 1917.
1,317,655.
Patented Sept. 30, 1919.
2 SHEETS—SHEET 1.
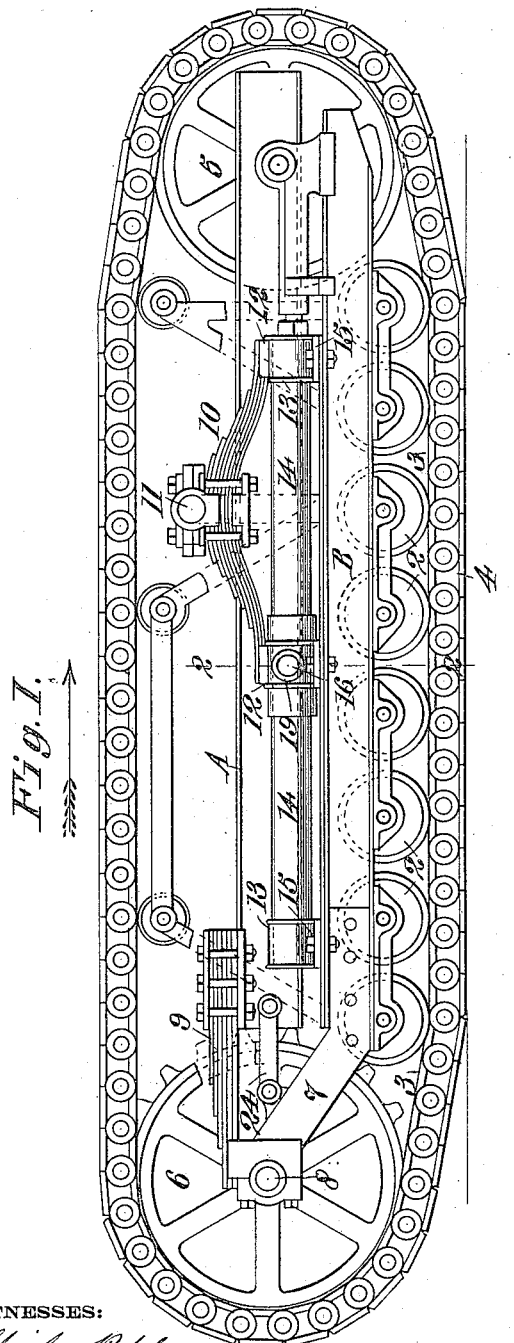
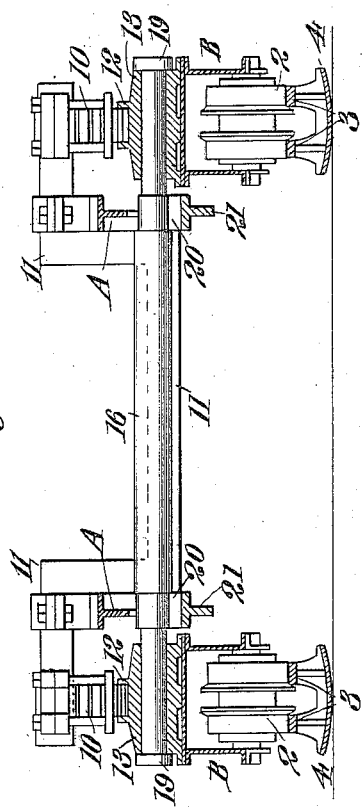
WITNESSES:
Charles Rickles
J. H. Herring
INVENTOR
Henry T. Preble
BY Strong & Townsend
ATTORNEYS

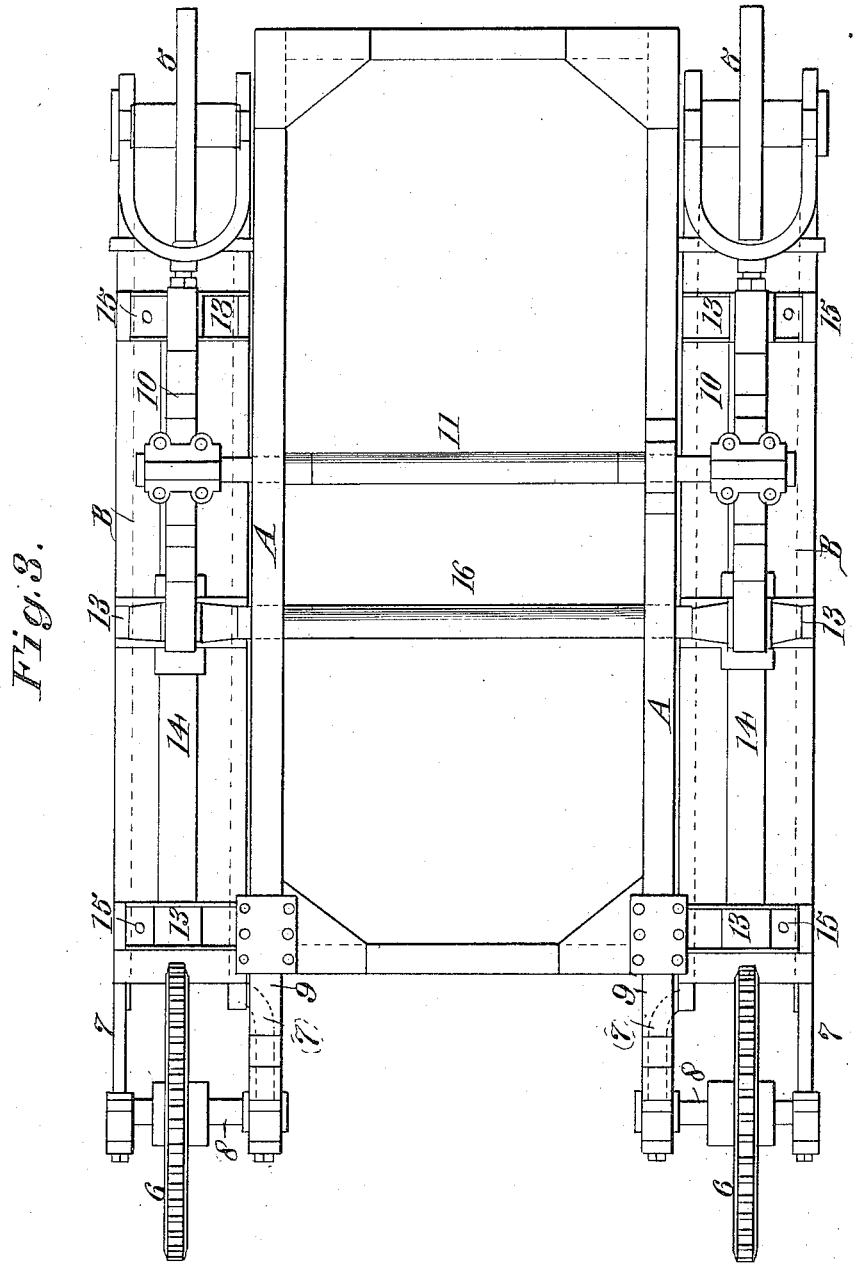

UNITED STATES PATENT OFFICE.

HENRY T. PREBLE, OF STOCKTON, CALIFORNIA.

TRACTOR.

1,317,655. Specification of Letters Patent. Patented Sept. 30, 1919.

Application filed October 16, 1917. Serial No. 196,802.

*To all whom it may concern:*

Be it known that I, HENRY T. PREBLE, a citizen of the United States, residing at Stockton, in the county of San Joaquin and State of California, have invented new and useful Improvements in Tractors, of which the following is a specification.

This invention relates to truck frames for endless self-laying track traction engines and vehicles, and pertains especially to truck construction for use in connection with the carriage or transportation of big guns or other heavy burden.

The type of machine to which the present invention is applicable is illustrated in United States Letters Patent No. 1,026,037, dated May 14, 1912, and No. 1,184,705, dated May 23, 1916, having more especial reference to the type of the last-mentioned patent in which the entire weight of the vehicle is supported upon a pair of endless self-laying tracks, the front steering wheel being omitted.

A particular object of the present invention is to give increased rigidity and strength to the truck when the same is considerably elongated so as to provide an extended bearing surface; it being understood that the trucks carry rollers on their underside running upon track rails on the endless self-laying track; the truck frames being of channel construction when their length is considerably extended are subject to abnormal twists and strains which it is the object of the present invention to obviate as far as possible. A further object is to support and brace the two trucks on opposite sides of the machine, each from the other independent of the main frame.

Having reference to the accompanying drawings,

Figure 1 is a side elevation of the invention.

Fig. 2 is a section on line 2—2 of Fig. 1.

Fig. 3 is a plan view of a chassis with the truck frames on endless tracks being omitted.

It has not been deemed necessary to show more of the apparatus than for a clear understanding of the invention and therefore while the apparatus is designed and has been built primarily for use as an armored tractor or tank, the driving mechanism and superstructure and various details in connection with such a vehicle have been omitted.

A represents a main frame of suitable construction and B—B represent a pair of truck frames arranged one on each side of the main frame A. Each truck frame is channel shape in cross-section carrying and partially housing the truck rollers 2 arranged in pairs and running upon the tracks 3 of the endless self-laying track belt 4. These truck frames are about the same length as the main frame and at the front of each is an idler wheel 5, around which the track belt 4 passes. Power to propel the belt is derived through the driving sprocket wheels 6 which are suitably journaled at the rear of the main frame.

Each truck has a rearwardly extending incline or goose-neck extension 7 in or upon which the shaft 8 of the driving sprocket 6 is journaled; the main frame A being spring supported on the trucks by means of cantaliver springs 9 at the rear and semi-elliptic springs 10 at the front; a drop axle 11 carrying the forward end of the main frame A with the ends of the axle resting on and secured to the semi-elliptic springs 10, which latter in turn have their ends slidably fitting in chairs 12 formed in extensions 13, which latter are fixedly secured to the top of the truck frames B.

Secured to the top of each truck frame and running nearly the entire length thereof is a tubular torsion member 14 which is of considerable diameter and of such construction and quality that when properly secured to the top or back of the truck frame the latter is reinforced against twisting and warping.

In practice each tubular torsion member 14 is electrically welded, or otherwise fixedly secured in a plurality of castings 13, these extensions having seats of substantial area to permit them to be firmly bolted, as shown at 15 to the top or back of the truck frame; the forward and intermediate chain or casting 13 having in addition the seats 12 for the sliding ends of the semi-elliptic springs.

In order mutually to support the trucks and without interference with either the main frame or the independent yielding motion of the individual trucks I provide a tubular cross-connector 16 having reduced ends 17 which loosely pass through perforations in the intermediate casting 13; the ends of the extension 17 being provided with caps 19, or other means to prevent the trucks spreading.

Where the main frame A is hung low it becomes necessary to cut away the bottom portions of the side bars as shown at 20 to provide clearance for the tubular transverse connector 16; the underside of the frames being suitably reinforced by trusses 21, as shown in Fig. 2. The relative position of the main frame and trucks is maintained through the medium of thrust links 24.

From the foregoing it will be seen that the main frame is yieldably supported at front and rear on the cantaliver springs 9 and the semi-elliptic springs 10 and each truck carries its own driving sprocket and front idler as a unit; and these truck frames may be of considerable length and practically free from twists and torsional strains due to the reinforcement provided by the tubular torsion rod 14 and its connections 13 in conjunction with the transverse tubular connector 16.

Having thus described my invention what I claim and desire to secure by Letters Patent is—

1. A truck for endless self-laying tracks comprising a channel structure with track rollers journaled therein and a tubular torsion member secured to the top of said channel structure.

2. An endless track unit consisting in the combination of a truck frame provided with rollers on its underside, a driving sprocket mounted at the rear of the truck frame, an idler wheel at the front thereof, an endless self-laying track extending around the sprocket and idler wheels and forming a track at its ground stretch upon which the rollers operate, and a reinforcing torsion resisting member extending longitudinally of the truck frame at the top thereof and rigidly secured thereto at a plurality of separated points for relieving the same of torsional strains.

3. In a vehicle, a main frame, an endless, self-laying track mechanism at each side thereof, an elongated truck frame arranged within each track and having rollers for operation upon the ground-run of the same, said truck frame and rollers at each side constituting the only support for the main frame, and a tubular member extending longitudinally of each truck frame and secured thereto for reinforcing the same against torsional strains.

4. In a vehicle, a main frame, an endless, flexible, self-laying track at each side thereof, a truck frame arranged within each track and having rollers for operation upon the ground-run thereof, a tubular torsion member extending longitudinally of each truck frame and secured thereto, and supporting connections for the main frame at each side secured to said torsional members.

5. In a vehicle, a main frame, an endless, flexible, self-laying track at each side thereof, a truck frame arranged within each track and having rollers for operation upon the ground-run thereof, a tubular torsion member extending longitudinally of each truck frame and secured thereto, supporting connections for the main frame at each side secured to said torsion members, said supporting connections including a semi-elliptical spring at each side mounted at its ends upon the torsion member, and a trunnion on the main frame journaled upon the central portion of the spring.

6. In a vehicle, a main frame, an endless, flexible, self-laying track at each side thereof, a truck frame arranged within each track and having rollers for operation upon the ground-run thereof, a tubular torsion member extending longitudinally of each truck frame and secured thereto, supporting connections for the main frame at each side secured to said torsion members said supporting connections including a semi-elliptical spring at each side mounted at its ends upon the torsion member, a trunnion on the main frame journaled upon the central portion of the spring, and a cross connection between opposite truck frame members.

In testimony whereof I have hereunto set my hand in the presence of two subscribing witnesses.

HENRY T. PREBLE.

Witnesses:
DAN N. SILMAN,
CHARLES L. NEUMILLER.